United States Patent Office 2,927,908
Patented Mar. 8, 1960

2,927,908

FLUORINATED ORGANOPOLYSILOXANE RUBBER REINFORCED WITH POLYTETRAFLUOROETHYLENE

George M. Konkle and Thomas D. Talcott, Midland, Mich., assignors to Dow Corning Corporation, Midland, Mich., a corporation of Michigan No Drawing. Application July 1, 1957
Serial No. 668,873

7 Claims. (Cl. 260—41)

This invention relates to the addition of polytetrafluoroethylene to fluorinated organopolysiloxane rubbers for the purpose of improving the tensile strength and tear resistance of the rubber.

Polytetrafluoroethylene has been employed in small quantities in silicone rubber stocks to improve tear strength. However, at a fairly low proportion of polytetrafluoroethylene to previously-employed organopolysiloxane rubber stock, the tensile strength of the stocks reached a peak after which subsequent addition of polytetrafluoroethylene decreased the tensile strength. When still more polytetrafluoroethylene was added, it was found to be incompatible with previously-known filled silicone rubber stocks.

New gums were invented and filled to form new silicone rubber stocks. Some of these stocks are covered in copending application Serial No. 594,113 of Eric D. Brown, filed June 27, 1956. When polytetrafluoroethylene was added to these stocks, the same phenomena were noted with regard to the peaking of tensile strength at low polytetrafluoroethylene to rubber ratios. However, on further experimentation it was found unexpectedly that tensile strength of these polytetrafluoroethylene-silicone rubber stocks increased to a new peak with addition of more polytetrafluoroethylene.

This invention relates to a composition of matter comprising a mixture of (1) an organopolysiloxane gum in which essentially all the units have the formula

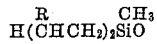

where each R is a monovalent perfluoroalkyl radical of from one to ten carbon atoms and each $n$ has a value of from 1 to 4 inclusive, said siloxane containing up to 10 mol percent of siloxane units of the formula $R'_2SiO$ where R' is selected from the group consisting of methyl, phenyl and vinyl radicals, (2) from 35 to 125 parts by weight based on 100 parts of (1) of polytetrafluoroethylene and (3) at least 5 parts of an inorganic filler per 100 parts of (1).

The polysiloxane gums (1) of this invention can be prepared by polymerizing cyclic organosiloxanes of the unit formula

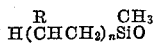

These cyclotrisiloxanes are readily polymerized to suitable polymers for making the elastomers employed in this invention. The best method of doing this is described in the copending application of Oscar K. Johannson, Serial No. 594,107, filed June 27, 1956. The preparation of cyclic trisiloxanes of the unit formula

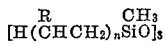

is described in the copending application of Ogden R. Pierce and George W. Holbrook, Serial No. 594,108, filed June 27, 1956. The preparation of siloxanes of the unit formula

is described in the copending application of Ogden R. Pierce, Serial No. 644,479, filed March 7, 1957, now Patent No. 2,894,969. All of these applications are hereby incorporated in this specification by reference.

In general, the polymerization of the cyclic trisiloxanes is best carried out in the presence of an alkaline catalyst such as alkali metal hydroxide or the alkali metal salts of siloxanols at temperatures ranging from 50 to 150° C. The cyclic trisiloxanes are best prepared by hydrolyzing the chlorosilanes in the conventional manner and heating the resulting hydrolyzate with an alkali metal hydroxide or silanolate under conditions which cause the cyclic trisiloxane to distill from the reaction mixture. The chlorosilanes of the formula

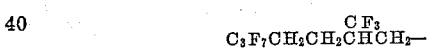

can be prepared by the reaction of an alkene of the formula $RCH=CH_2$ with methyldichlorosilane in the presence of a peroxide or platinum catalyst at temperatures of from 150 to 300° C. in such proportions as to produce the desired product, i.e.

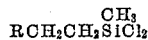

or the telomer formed by the telomerization of the alkene in situ prior to reacting with the methyldichlorosilane.

R can be any monovalent perfluoroalkyl radical of from one to ten carbon atoms, such as $CF_3$, $C_2F_5$, $C_3F_7$, $C_7F_{15}$ and $C_{10}F_{21}$. These radicals can be either straight chain or branch chain. Furthermore, there can be different R groups within the same molecule and, in the case of the siloxane unit containing a telomer, different R groups within the telomer radical, e.g.

$n$ can have a value of from 1 to 4, producing such units as

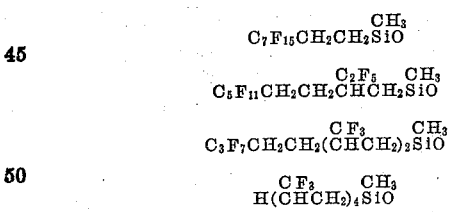

If desired, the siloxanes employed in this invention can be copolymers of the above-defined fluorinated siloxanes with up to 10 mol percent methyl, phenyl and vinyl siloxanes. These copolymers can be prepared by the alkaline copolymerization of cyclics of the formula $(R'_2SiO)_3$ and

as shown in the aforesaid Johannson application. The unit $R'_2SiO$ can be, for example, phenylmethylsiloxane, dimethylsiloxane, methylvinylsiloxane, diphenylsiloxane, phenylvinylsiloxane and divinylsiloxane. If the amount of $R'_2SiO$ units in the siloxane is higher than 10 mol percent, inferior swell resistance results.

The polytetrafluoroethylene employed in this invention is commercially available and is introduced into the siloxane in particle form by milling. During roll-milling, the polytetrafluoroethylene particles are drawn into strong, tough fibers by the shearing action of the mill and distributed evenly throughout the siloxane. When less than 35 parts of polytetrafluorothylene is added per 100 parts of siloxane gum, the tensile strength of the ultimate stock will be substantially reduced. When more than 125 parts of polytetrafluoroethylene per 100 parts of gum in the rubber stock were tried, the polytetrafluoroethylene became incompatible in the stock with a resulting reduction in tensile strength caused by an unintegrated system.

The elastomers of this invention may contain any suitable filler. The preferred fillers are inorganic materials such as metal oxides such as titania, zinc oxide, ferric oxide and the like; siliceous materials such as clay, diatomaceous earth, crushed quartz and silicas such as fume silica, silica aerogels and silica xerogels. If desired, the fillers, particularly the silicas, may be treated with chlorosilanes or in other ways so that the surfaces thereof have organosilyl groups attached to the silicon by SiOSi linkages. For example, the surfaces of the fillers can be modified with trimethylsilyl groups, phenyldimethylsilyl groups, 3,3,3-trifluoropropylmethylsilyl groups and dimethylvinylsilyl groups by the method shown in the copending application of Leslie J. Tyler, Serial No. 160,100, filed May 4, 1950, now Patent No. 2,863,846.

The fillers can be employed in any desired amount ranging from 5 parts to over 200 parts per 100 parts of polymer. The precise amount of filler employed in any case will vary with the type of filler and the properties desired in the finished elastomer.

The elastomers of this invention can be vulcanized by any of the known methods for vulcanizing organosiloxane elastomers. One of the preferred methods comprises heating the compounded elastomer with an organic peroxide such as benzoyl peroxide, tertiary-butyl perbenzoate, dicumyl peroxide, chlorobenzoyl peroxides, and tertiary-butyl peracetate. Preferably these peroxides are employed in amounts from .1 to 10% by weight based on the weight of the polysiloxane.

If desired, the compositions of this invention can also contain further additives, such as compression set additives, pigments, oxidation inhibitors and other materials commonly employed in organopolysiloxane rubbers.

The order of addition to the siloxane gum in the rubber compounding roll mill is not critical except where possible incompatibility makes advisable the addition of critical ingredients first.

The compositions of this invention are excellent for insulation and gasket materials. They show good resistance to solvents and fuels and good tensile and tear strengths to a degree unrealized in the art before.

The following examples are illustrative only and are not intended to limit this invention which is properly set forth in the claims.

*Example 1*

The following formulations were milled on a two-roll rubber compounding mill. All parts are by weight.

I. 100 parts of (A) an organopolysiloxane gum consisting of 99.5 mol percent 3,3,3-trifluoropropylmethylsiloxane units and 0.5 mol percent methylvinylsiloxane units.
   4.5 parts of (B) a hydroxy-endblocked dimethylpolysiloxane fluid containing 3.15 percent by weight silicon-bonded hydroxyls.
   30 parts of (C) a precipitated silica 3 parts of (D) bis-(2,4-dichloro)benzoyl peroxide
   25 parts of polytetrafluoroethylene
II. 100 parts of (A)
   4.5 parts of (B)
   30 parts of (C)
   3 parts of (D)
   35 parts of polytetrafluoroethylene
III. 100 parts of (A)
   4.5 parts of (B)
   30 parts of (C)
   3 parts of (D)
   90 parts of polytetrafluoroethylene
IV. 100 parts of (A)
   3 parts of (B)
   20 parts of (C)
   3 parts of (D)
   125 parts of polytetrafluoroethylene Each of these compositions was vulcanized and cured for 24 hours at 150° C. Samples of the resulting products were immersed in a diester oil for 70 hours at 350° F. Other samples were immersed in a fuel consisting of 70 percent by volume isooctane and 30 percent by volume toluene for 70 hours at room temperature.

The samples were tested for durometer hardness, tensile strength (pounds per square inch) and tear strength (pounds per inch).

|  | After cure | After immersion in the— | |
|---|---|---|---|
|  |  | Diester oil | Fuel |
| I |  |  |  |
| Durometer | 79 | 74 | 75 |
| Tensile | 870 | 644 | 644 |
| Tear | 305 |  |  |
| II |  |  |  |
| Durometer | 85 | 77 | 76 |
| Tensile | 1,410 | 1,128 | 1,156 |
| Tear | 495 |  |  |
| III |  |  |  |
| Durometer | 87 | 84 | 85 |
| Tensile | 1,720 | 1,332 | 1,204 |
| Tear | 677 |  |  |
| IV |  |  |  |
| Durometer | 80 | 76 | 73 |
| Tensile | 980 | 549 | 920 |
| Tear | 454 |  |  |

*Example 2*

When an organopolysiloxane gum consisting of 50 mol percent 5,5,5-trifluoro-2-(trifluoromethyl)amylsiloxane units, 43 mol percent 3,3,4,4,4-pentafluorobutylmethylsiloxane units, 3 mol percent dimethylsiloxane units, 3 mol percent phenylmethylsiloxane units and 1 mol percent methylvinylsiloxane is substituted for the organopolysiloxane gum (A) of Example 1, similar high-strength solvent-resistant compositions are obtained.

*Example 3*

When any of the following groups are substituted for the 3,3,3-trifluoropropyl radical in gum (A) of Example 1, similar compositions result:

$C_2F_5CH_2CH_2-$, $C_3F_7CH_2CH_2-$, $C_7F_{15}CH_2CH_2-$ and $C_{10}F_{21}CH_2CH_2-$.

*Example 4*

When $TiO_2$ and diatomaceous earth are each substituted for the silica filler (C) of Example 1, similar compositions are produced.

*Example 5*

When component (B) is omitted from the compositions of Example 4, similar coatings are produced.

*Example 6*

When dicumylperoxide and tert-butyl perbenzoate are each substituted for peroxide (D) in Example 1, similar excellent compositions are produced.

That which is claimed is:
1. A composition of matter comprising a mixture of (1) an organopolysiloxane gum selected from the group consisting of polymers in which all the recurring units have the formula

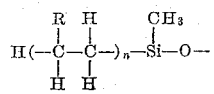

where each R is a monovalent perfluoroalkyl radical of from 1 to 10 carbon atoms and $n$ has a value from 1 to 4 inclusive and copolymers containing at least 90 mol percent of the aforesaid siloxane units and up to 10 mol percent siloxane units of the formula

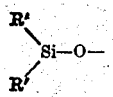

where R' is selected from the group consisting of methyl, phenyl and vinyl radicals, (2) from 35 to less than 125 parts by weight based on 100 parts of (1) of polytetrafluoroethylene and (3) at least 5 parts of an inorganic filler per 100 parts of (1).

2. A vulcanizable composition comprising a mixture of (1) an organopolysiloxane gum selected from the group consisting of polymers in which all the recurring units have the formula

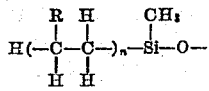

where each R is a monovalent perfluoroalkyl radical of from 1 to 10 carbon atoms and $n$ has a value from 1 to 4 inclusive and copolymers containing at least 90 mol percent of the aforesaid siloxane units and up to 10 mol percent siloxane units of the formula

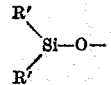

where R' is selected from the group consisting of methyl, phenyl and vinyl radicals, (2) from 35 to less than 125 parts by weight based on 100 parts of (1) of polytetrafluoroethylene, (3) at least 5 parts of an inorganic filler per 100 parts of (1), and (4) from 0.1 to 10 parts by weight per 100 parts of (1) of an organic peroxide.

3. A composition of claim 1 in which all of the recurring units in the polysiloxane are

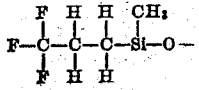

units.

4. A vulcanizable composition of claim 2 in which all of the recurring units in the polysiloxane (1) are

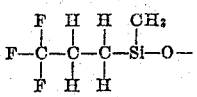

units.

5. A composition of claim 1 in which the filler (3) is a silica filler.

6. A vulcanizable composition of claim 2 in which the filler (3) is a silica filler.

7. A composition of claim 1 in which the siloxane (1) is a copolymer containing at least 90 mol percent

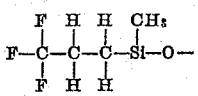

units and up to 10 mol percent methylvinylsiloxane units and in which the filler (3) is a silica filler.

References Cited in the file of this patent

UNITED STATES PATENTS

| | | |
|---|---|---|
| 2,710,290 | Safford et al. | June 7, 1955 |
| 2,719,833 | Vincent et al. | Oct. 4, 1955 |
| 2,865,795 | Morrison | Dec. 23, 1958 |

OTHER REFERENCES

Clark: "Elastomeric Fluoroalkyl Siloxane Copolymers," July 1954; pages 4–12; WADC Technical Report 52–213; published by Wright Air Development Center, Wright-Patterson Air Force Base, Ohio.

Crandell: "Rubber World," November 1955, pages 236–240.

Tarrant: "Development of Fluoro-Silicone Elastomers," August 1955, pages 3 and 38, WADC Technical Report 55–220, published by Wright Air Development Center, Wright-Patterson Air Force Base, Ohio.